Oct. 25, 1966  A. E. BREWSTER ETAL  3,280,947
CLUTCH APPARATUS
Filed Nov. 5, 1962  7 Sheets-Sheet 2
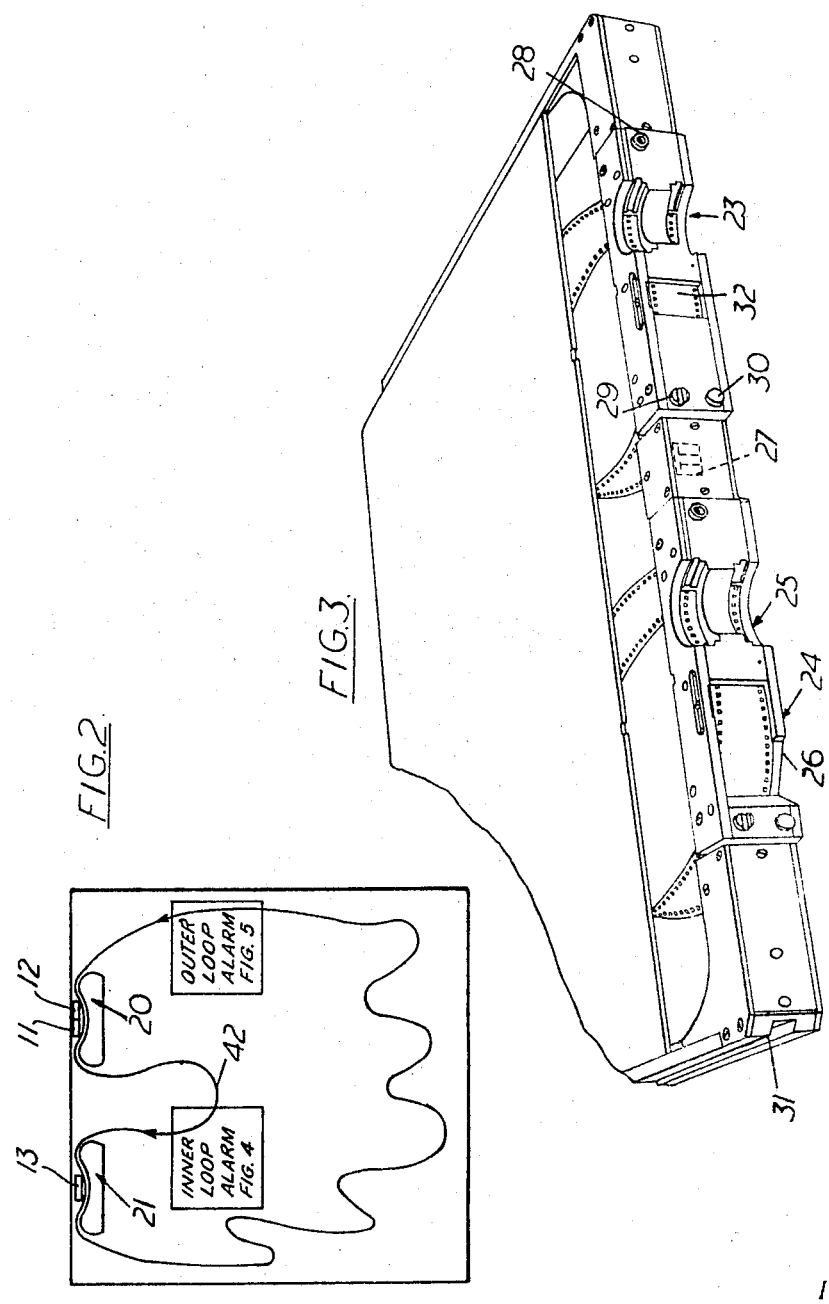
Inventors
ARTHUR E. BREWSTER
BRIAN S. MASON
GEOFFREY R. PEARCE
By
Attorney

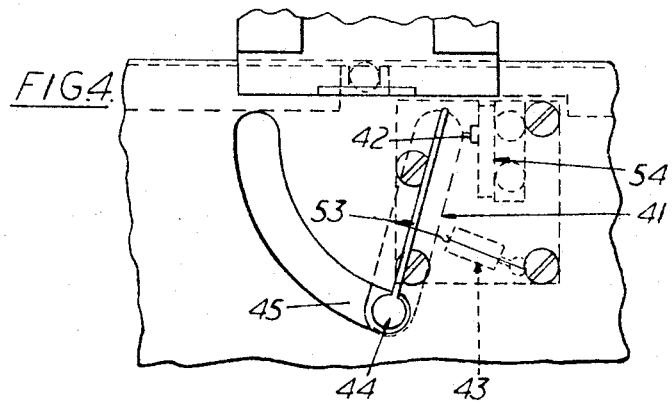
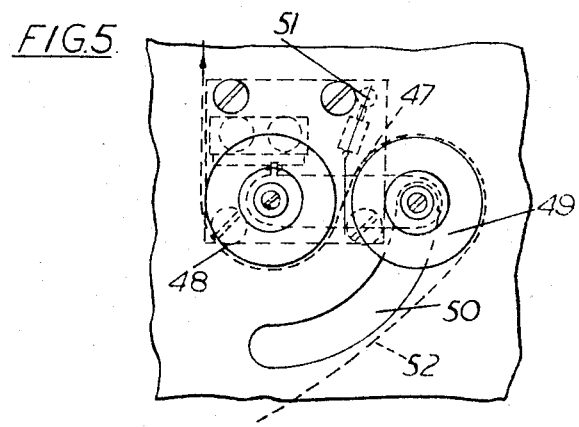
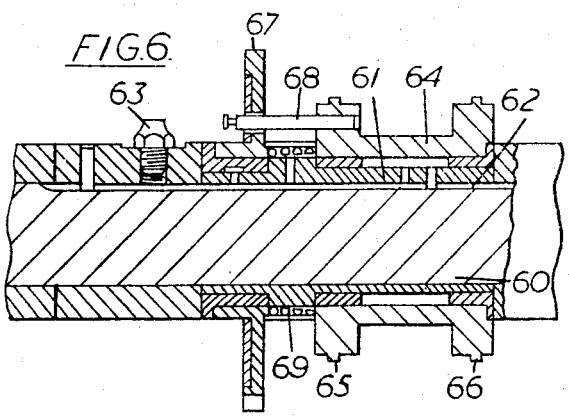
Inventors
ARTHUR E. BREWSTER
BRIAN S. MASON
GEOFFREY R. PEARCE
By
Attorney

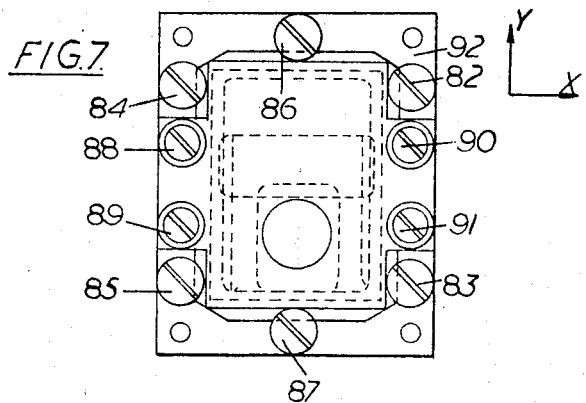
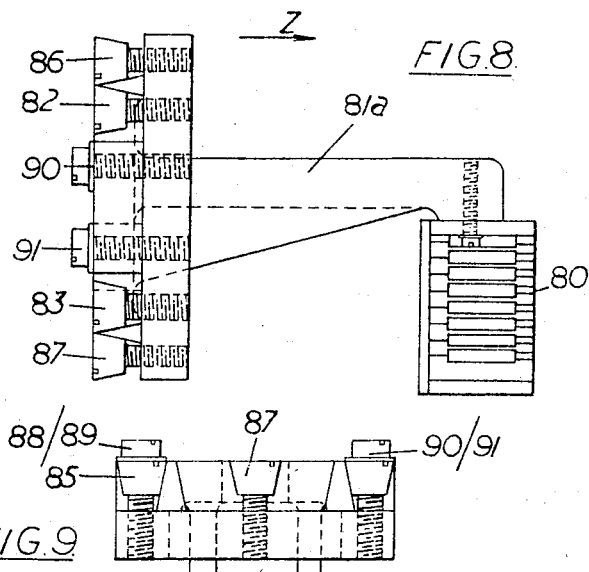
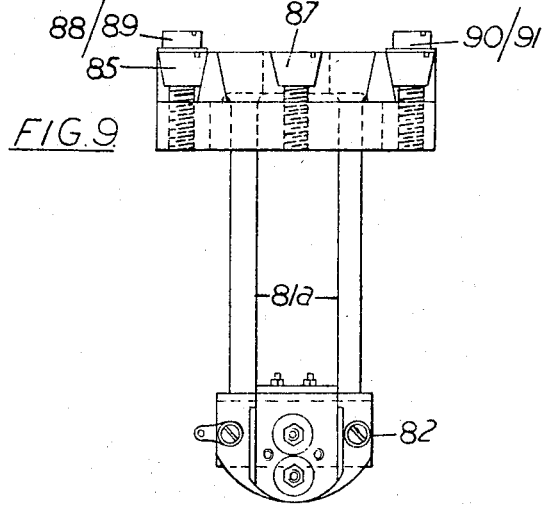

Oct. 25, 1966  A. E. BREWSTER ETAL  3,280,947
CLUTCH APPARATUS
Filed Nov. 5, 1962  7 Sheets-Sheet 5
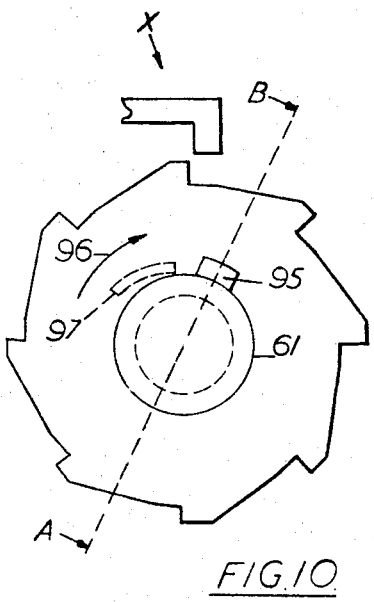
FIG.10
FIG.11
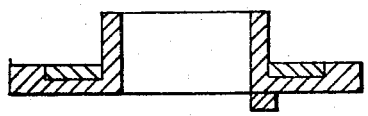
Inventors
ARTHUR E. BREWSTER
BRIAN S. MASON
GEOFFREY R. PEARCE
By
Attorney

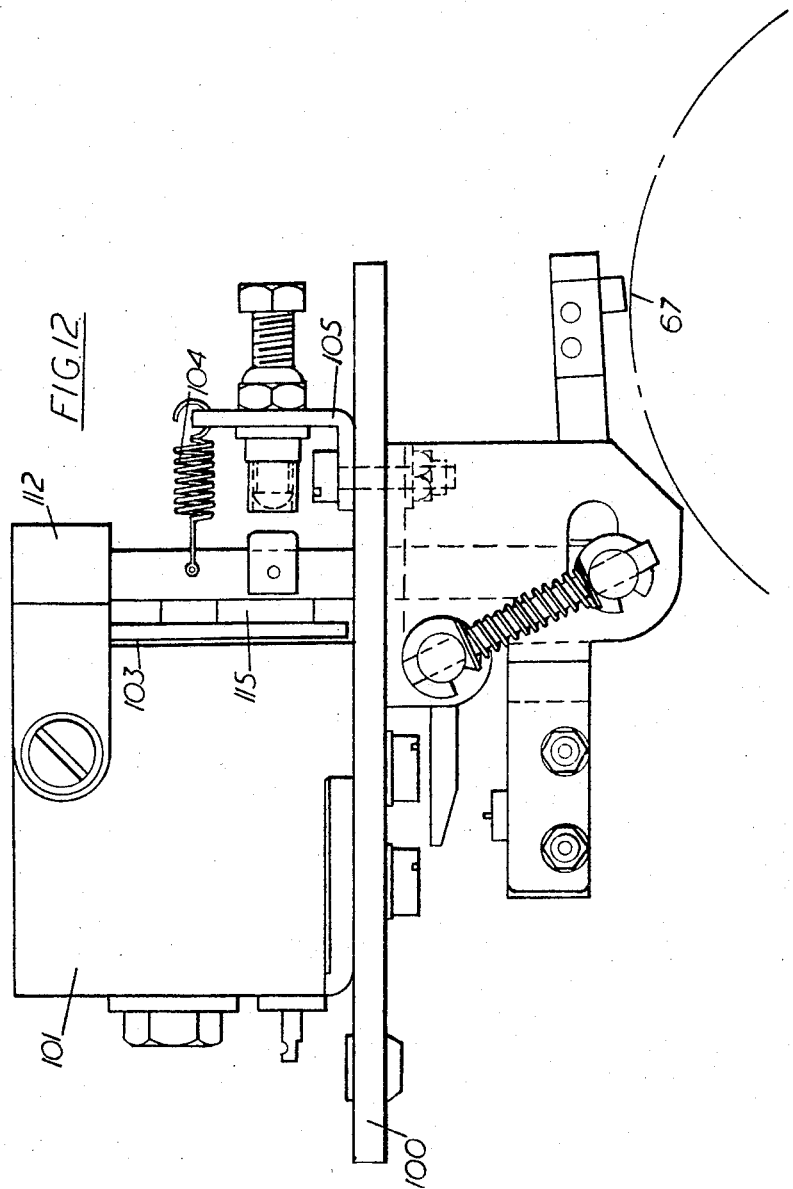

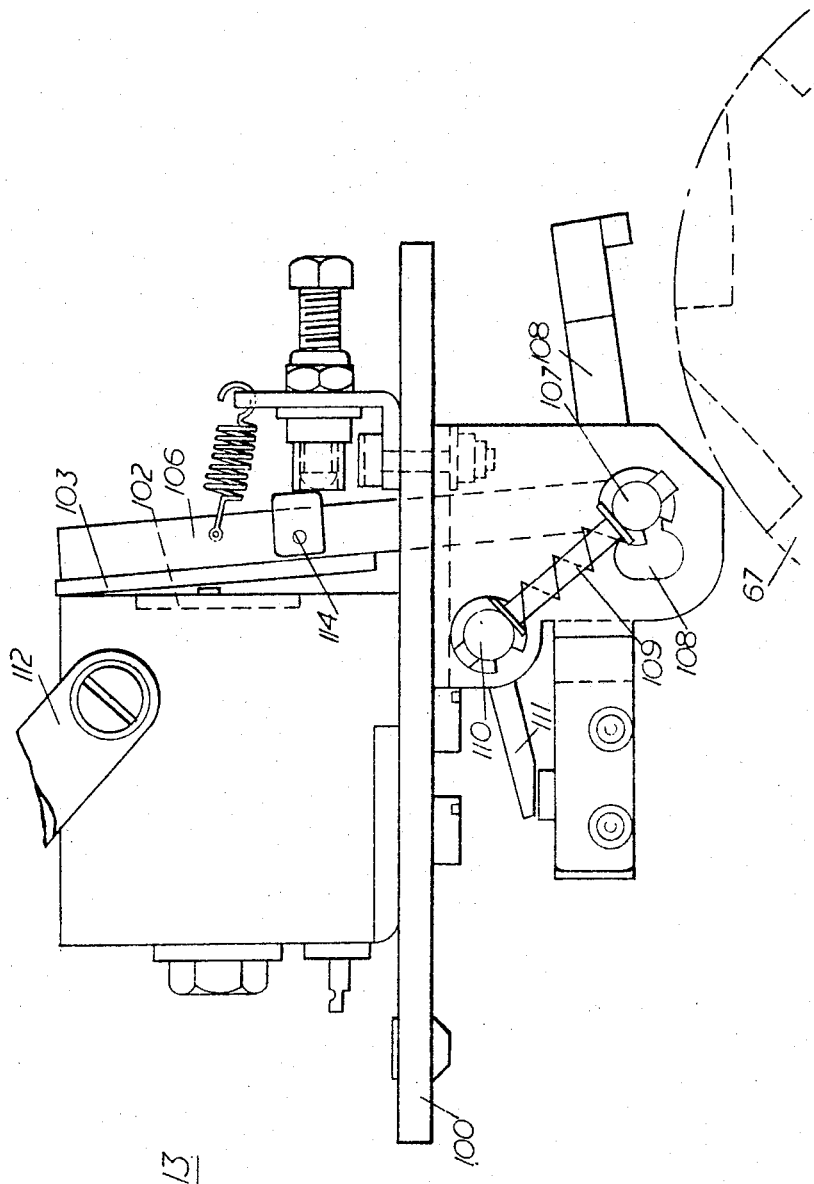

United States Patent Office 3,280,947
Patented Oct. 25, 1966

3,280,947
CLUTCH APPARATUS
Arthur Edward Brewster, London, Brian Stanley Mason, Croydon, Surrey, and Geoffrey Roland Pearce, London, England, assignors to International Standard Electric Corporation, New York, N.Y., a corporation of Delaware
Filed Nov. 5, 1962, Ser. No. 235,260
Claims priority, application Great Britain, Nov. 16, 1961, 41,115/61
1 Claim. (Cl. 192—26)

This invention relates to clutches, such as may be used between a driving motor and a tape, and to storage apparatus in which intelligence is stored on magnetic or other tape.

According to the present invention there is provided a mounting arrangement for a head unit for a tape machine, which comprises a first plate forming part of the tape machine structure, a second plate carrying the head unit, fastening means interconnecting said two plates, and a set of tapered head screws journalled in said first plate, each said screw having its head bearing against an edge of said second plate in which to adjust the relative positions of said plates and hence the position of said head unit, said fastening means is loosened, said tapered-head screws rotated until the relative positions of said plates is correct, and said fastening means tightened.

According to the present invention there is also provided a clutch which comprises a drive shaft, a driven member rotatably mounted on said shaft, a detent wheel also rotatably mounted on said shaft, said detent wheel being spaced from said driven member and having an abutment facing said driven member, a helical spring which embraces said drive shaft and has one end anchored to said driven member and the other end adjacent to said detent wheel so that it can cooperate with said abutment, a detent member movable between a first position in which it locks said detent wheel against rotations and a second position in which it does not lock said detent wheel, and a coupling between said detent wheel and said driven member whereby said detent wheel and said driven member can rotate together but which permits slight angular displacement of one with respect to the other, the arrangement being such that when said detent member moves from its first to its second position said spring causes an initial movement of said detent wheel as a result of which the unanchored end of said spring is disengaged from said abutment and coils on the shaft, so that the shaft drives both the driven member and the detent wheel, and that when said detent member moves to its second position it locks the detent wheel, after which the unanchored end of the spring hits the abutment and said spring is thus disengaged from said shaft, thus stopping the drive.

The invention will now be described with reference to the accompanying drawings, in which:

FIG. 2 is a schematic plan view of a removable tape magazine for the machine of FIG. 1.

FIG. 3 is a perspective view of a tape magazine such as shown in FIG. 2, with its top plate partly removed.

FIGS. 4 and 5 are detailed views of the two "tape-taut" alarm devices used in the tape magazines.

FIG. 6 is a detail, partly sectionalised, showing one of the clutch/sprocket arrangements used for driving the tape.

FIGS. 7, 8 and 9 are respectively plan, side and end views of the magnetic read/record head units, these being on an enlarged scale.

Figure 1:
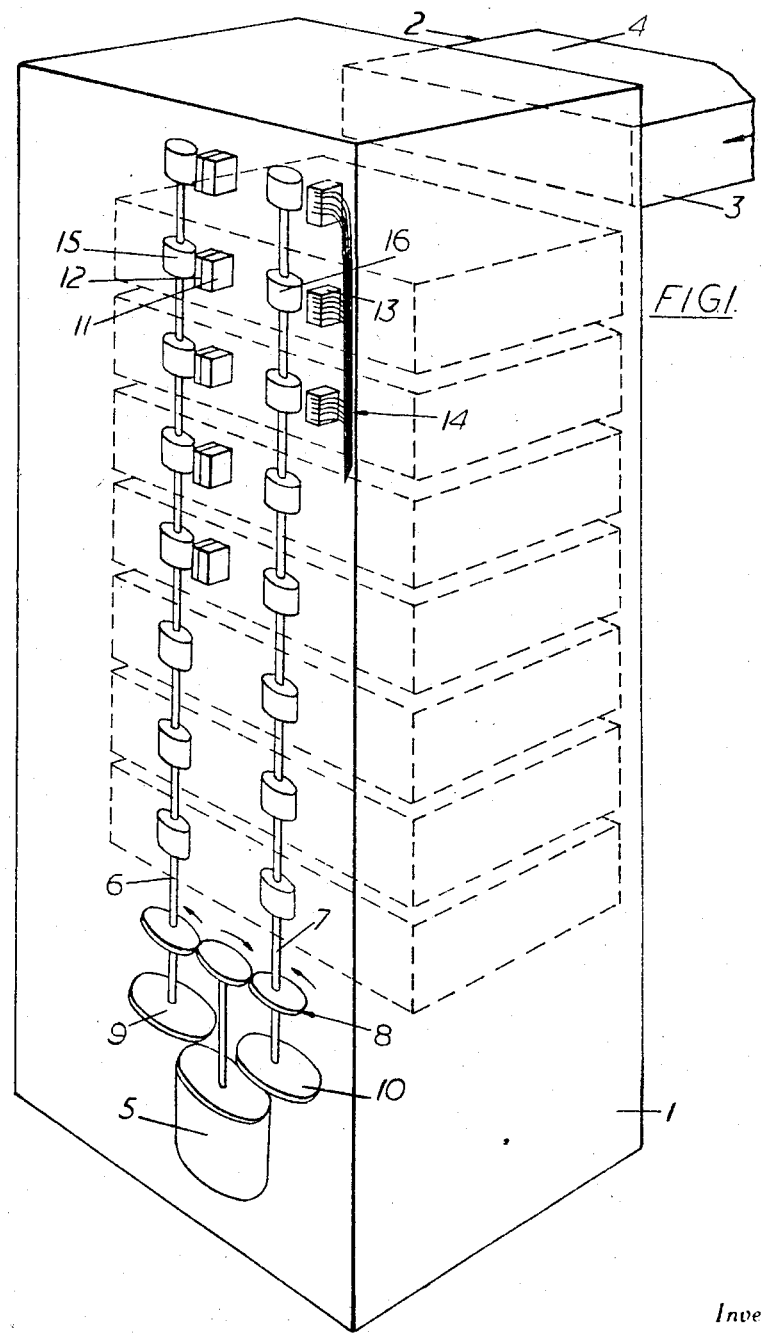
FIG. 1 is a schematic representation (seen from behind) of a magnetic tape machine according to the invention.

Referring first to FIG. 1, the tape machine is mounted in a cubicle 1, which in the example described can accommodate eight tape magazines. As will be seen later, each magazine is a rectangular box having a closed loop of film bearing a magnetic recording medium, and having read shoes and write shoes. Along the sides 2, 3 a box such as 4 has grooves, each of which can receive a rail on the inside of the cubicle 1. When a box is inserted (as shown in FIG. 1 for box 4), it is placed in the cubicle 1 with its grooves fitting over the two rails and pushed home until a socket on the box receives pins of a plug inside the cubicle. The front of the cubicle can be closed by a detachable panel or by a door.

At the bottom of the cubicle 1 is an electric motor 5, which runs continuously while the tape machine is in use. This motor drives two shafts 6 and 7, known as the record shaft and the read shaft respectively via gears indicated at 8. These two shafts, which rotate continuously, carry flywheels indicated at 9 and 10 to stabilise their rotation.

For each box-receiving position there is provided a record head unit 11, an erase head unit 12 in advance of the record head unit, and a read head unit 13. Permanently-wired connections are also provided, as indicated schematically at 14. For each box there is a pair of clutches such as 15 and 16, one on each shaft. To record data on the tape of one tape magazine, the clutch such as 15 on the record shaft for that magazine is operated to connect the record shaft to a drive sprocket. With a tape magazine in place, this drives the tape. At the same time the data to be recorded is applied to the record head unit and the erase head unit energised so as to wipe the tape clean in advance of the new data to be recorded. When reading is necessary, operations are generally similar with the premise that no erasure is effected. It is worth mentioning that if the tape machine includes magazines containing "library" information which is not subject to change, positions for such magazines could if desired omit record and erase head units.

FIG. 2 shows schematically the plan of a tape magazine, the tape being a plastics film carrying a magnetic medium and having a row of sprocket holes along each edge. The tape is edgewise in the magazine, and is guided through a record shoe 20 and a read shoe 21, these shoes guiding the tape so that, when the magazine is in the machine the tape is urged towards and against the heads. Each tape cooperates with blocks of eight heads so that recording can occur on eight parallel tracks.

In FIG. 3, which shows the tape box inverted, the two shoes can be seen at 23, 24 respectively, 23 being the read shoe and 24 the record shoe. The semicircular recess 25 receives the drive sprocket, the central projection falling between the two rows of sprocket teeth of the drive sprocket when the magazine is in place. The record/erase head unit fits into the gap 26 when the magazine is in place so that the tape is pulled past its heads when the record shaft clutch is engaged.

The read shoe 23 is generally similar to the record shoe, and is shown in FIG. 3 with an aperture 32 to receive the read head unit. The recess to receive the record head unit is larger than that for the read unit as the former unit is preceded (as viewed by the tape) by an erase unit. Between the shoes there is a six-pin socket 27, for cooperating with a plug in the cubicle. This is in conjunction with the tape alarms to be described later.

To return to the read and record shoes, it will be appreciated that it is desirable for the tape to be accurately located with respect to the heads. For this purpose each shoe has three locating studs, one of which, stud 28 has a conical recess, a second of which, 29 has a longitudinal cut (like the crosscut in the head of a screw), while the third 30, has a plain head. These specially-shaped studs cooperate with corresponding studs in the cubicle to locate the tape box accurately, the shoes each being resiliently mounted in their magazines.

Behind the tape at each of the regions with which the heads cooperate, is a plate which is spring-biased outwards so that the film is urged against the head units when the tape magazine is installed in the cubicle.

In FIG. 3 can be seen the groove 31, which receives a rail on the inside of the cubicle, as already described.

The magazine is provided with a handle at the front (the end opposite to that holding the shoes), which handle does not appear in FIG. 3.

Mention has already been made that each tape box or magazine is provided with tape taut alarms: these are intended to stop operations by automatically disconnecting from the supply the appropriate clutch-controlling detent magnets (see below), and to give an audible and/or visible alarm when either of the two loops in the box is too short. The first alarm to be described is the inner loop alarm, the inner loop being the loop 42, FIG. 2, passing from the record shoe to the read shoe. The length of the loop is increased as recording occurs and decreased as reading occurs. The alarm, placed within the inner loop includes an arm 41 FIG. 4 pivotally mounted at 42, and spring-biassed anticlockwise as shown in FIG. 4 by a spring 43. The end of the arm carries a post 44 and attached plate 53, the post engaging in a curved groove 45 on the inner face of the wall of the tape magazine. The post 44 engages with the tape when the box contains a tape.

In use the spring 43 urges the arm anticlockwise, but if the tape gets too tight the tape acting on the post 44 urges the arm clockwise against the spring. The alarm device shown in FIG. 4 is placed inside the box immediately behind the central portion which carries the socket 27 (FIG. 3), and when it has been turned far enough for the post 44 to reach the upper end of the quadrantal groove 45, contacts of the switch 54 are closed thereby, to give the alarm. In addition (as already mentioned) the detent magnet for the clutch controlling reading is disabled, there being normally closed contacts in series therewith which are opened when the alarm is operated.

The outer loop alarm, FIG. 5 is placed inside the box in the corner adjacent to one of the shoes, the recording shoe in the machine described. This has an arm 47 pivoted about its left-hand end and carrying rollers 48, 49 one at each end. The right-hand end of the arm moves in a groove 50, and is urged counterclockwise by a spring 51. The tape passes round as indicated by the broken line 52, and if it gets too tight it rotates the arm 47 against the spring 51 to cause the alarm to be given. In addition, the detent magnet controlling the clutch for recording is disabled in a manner similar to that already described for the reading clutch.

The clutch device (either for the reading shaft or the recording shaft) for communicating a drive to a tape box is shown in the fragmentary sectional view of FIG. 6. The shaft has a portion 60 onto which is keyed a sleeve 61, which rotates with the shaft. Between this sleeve and the shaft is a lubrication channel 62, for grease, this being fed in via a nipple 63. Mounted on this sleeve but rotatable with respect thereto are the sprocket driver 64, which has two rows of teeth 65, 66 and a detent wheel 67 having teeth whose spacing corresponds to one step of a driven tape.

The sprocket driver and the detent wheel 67 are interconnected by a pin 68 which is journalled in both of these members.

Between the sprocket driver 64 and detent wheel 67 and the sleeve 61 is a coil spring 69, which is anchored to the sprocket at one end, but which has its free end in rubbing contact with the inner surface of the detent wheel 67 when the clutch is not driving. When the detent wheel is released by the operation of the detent magnet (not shown in FIG. 6), a small movement of the detent wheel with respect to the sprocket occurs, the extent of this depending on the fact that the left-hand end of the pin 68 is journalled in a slot in the detent wheel 67. This movement allows the free end of the coil spring 69 to break contact with an abutment within the detent wheel. Due to the shaft rotation and also to the coiling action of the spring 69, the latter locks itself around the shaft, so that the sprocket commences to drive the tape. When the detent magnet is again operated, a pawl controlled by its armature enters the path of the wheel's teeth and stops the wheel and also the sprocket drive. The coil spring 69 continues to be driven by the shaft until its free end contacts the abutment on the inside of the detent wheel, which latter, in effect, retracts the spring from the shaft. This minimises wear on shaft and spring.

The arrangement of the detent wheel will be clear from FIGS. 10 and 11, of which FIG. 10 shows the right-hand (as seen in FIG. 6) face of the wheel. On its face is an abutment 95 whose radial length is three sixteenth of an inch. The height and axial dimensions being both 50 mils. This size of abutment is used where the portion of the sleeve 61 embraced by the spring 69 (FIG. 6) has a diameter of 1¼ inches. FIG. 10 also shows at X the position of the detent, while the arrow 96 indicates the direction of rotation of the detent wheel when free to move.

When the detent wheel is free it is constained to turn with the sprocket due to the pin connection, whose hole is not shown in FIG. 10, the end of the spring is clear of the abutment 95, as indicated schematically at 97, and due to its tendency to coil grips the sleeve 61 firmly. In this position the spring is normally biased to coil to a drive shaft gripping position.

This gripping action provides the drive. When the detent is moved into the path of the teeth, one of these teeth hits the detent and so locks the wheel against movement. A short time after this occurs the free end of the spring hits the abutment or detent 95, and is thus retracted from the sleeve 61 as a slight bowing of the spring occurs. Thus the drive is stopped.

The preparation of the spring is of some importance and the spring is prepared so that its internal surface which embraces the sleeve 61 is tapered. The internal diameter of the spring at the stop end i.e. that which cooperates with the detent wheel abutment, is less than that at the anchor end. This is effected by grinding the internal surface to a parallel bore while the wound spring is inside a tapered jig. As a consequence of this tapered inner face on the spring, wear on the spring and sleeve due to stopping and starting the drive is less than would be the case where a parallel bore is used.

Normally the detent wheel, and hence also the sprocket driver are restrained by a pawl, which is controlled by an electromagnet mounted on the tape machine to one side of its clutch. This is mounted on one side of the clutch assembly, adjacent to the shaft. A single magnet energisator enables one unit step of the tape drive to occur.

The magnet assembly will be described below with reference to FIGS. 12 and 13.

The mounting arrangements on the tape machine for a head unit will now be described with special reference to a read head unit such as that shown in FIGS. 7–9 inclusive. The unit includes eight heads mounted in a single block indicated at 80, which has to be adjusted in all three axes. Adjustment in the X axis uses the tapered screws 82–83–84–85, adjustment of which effects a bodily movement of the head unit. In a similar way, tapered screws 86 and 87 effect adjustment in the Y axis. The above mentioned shims are spacers between the plate in which screws 88–91 (see below) are journalled and the ends of a pair of brackets 81a on which the head block is mounted.

This method of mounting the head unit enables adjustment in the X axis to be effected without disturbing the Y axis adjustment and vice-versa. The thread pitch of the screws 82–85 and the angle of taper can be so arranged that one complete turn of the screw moves the head unit by a distance corresponding to one bit of information, in this case approximately 3 mils. Further, a combined adjustment of the screws 82–87 enables the head unit to be rotated to cater for skew adjustment. During adjustment four further screws 88, 89, 90 and 91 are unlocked so that the head unit can move with respect to the block 92, rigidly mounted in the cubicle.

FIGS. 12 and 13 show the magnet whose operation controls the pawl, which cooperates with the teeth on the detent wheel shown on FIG. 6. Each of these magnets is mounted on the face of a plate which forms the support for the shafts 6 and 7 (FIG. 1) but on the reverse face thereof from that on which the shafts are mounted. This plate is shown at 100, FIGS. 10 and 11.

A detent magnet assembly comprises a solenoid 101 having a central portion of magnetic material with a poleface 102, the solenoid structure being of generally square cross-section. A plate armature 103 cooperates with this solenoid, having a lug on its back connected via a spring 104 to a fixed support 105; also secured to the spring is a girder 106, which extends through the plate 100 towards the controlled detent wheel 67. This is shown as a broken line arc in FIG. 12 but two of its teeth are shown by broken lines in FIG. 13.

The lower end (in FIGS. 12 and 13) of the girder 106 carries a shaft 107, which carries the detent arm 108'. This shaft is journalled at its ends in two shaped holes, one of which is shown at 108. A rod 109, embraced by a cast spring, connects the shaft 107 to a second shaft 110 on which is mounted a tongue 111.

FIG. 12 shows the device in its engaged position, the armature actually being held in place by a clip 112 (shown withdrawn in FIG. 13) which is used only for holding the armature on during assembly or adjustment. FIG. 13 shows the device in its off condition.

If the coil of the solenoid is energised when the device is off, the armature is attracted and rotates about its upper (in FIG. 13) end until it is flat against the solenoid. Due to the connection between armature 103 and girder 106 provided by the spring and also by the pin 114 the girder 106 is rocked during this movement. The girder 106 fits into a slot in the lug 115 on the armature. This moves its lower end in the hole 108 from the position shown in FIG. 13 to that shown in FIG. 10, as a result of which the detent is moved into the path of the teeth on wheel 67, stopping the drive.

To release the clutch, as needed for driving the tape the coil is deenergized so that the device reverts from the condition shown in FIG. 12 to that shown in FIG. 13.

It is to be understood that the foregoing description of specific examples of this invention is not to be considered as a limitation on its scope.

What we claim is:

A clutch comprising a drive shaft, a driven member rotatably mounted on said shaft, means including a detent wheel, means for intermittently controlling the movement of the driven member, also rotatably mounted on said shaft, said detent wheel being spaced from said driven member and having an abutment facing said driven member, a helical spring drive means for selectively connecting the drive shaft to the driven member in accordance with the movement of the detent wheel, said spring embracing said drive shaft and having one end anchored to said driven member with the other end unanchored, the inner face of said spring being tapered so the thickness of the spring is less at its unanchored end than at its anchored end with the unanchored end being adjacent said detent wheel so that it can operate with said abutment, a detent member movable between a first position in which it locks said detent wheel against rotations and a second position in which it does not lock said detent wheel, and a coupling between said detent wheel and said driven member whereby said detent wheel and said driven member can rotate together but which permits slight angular displacement of one with respect to the other, the arrangement being such that when said detent member moves from its first to its second position said spring causes an initial movement of said detent wheel as a result of which the unanchored end of said spring is disengaged from said abutment the spring assumes a normally biased position to coil to a drive shaft gripping position, and its coils on the shaft to grip the shaft, so that the shaft drives both said driven member and said detent wheel, and that when said detent member moves from its second to its first position it locks said detent wheel against rotation, after which the unanchored end of said spring hits said abutment to prevent rotation of the unanchored end of the spring and said spring is thus disengaged from said shaft, thus stopping the drive.

References Cited by the Examiner

UNITED STATES PATENTS

| | | | |
|---|---|---|---|
| 2,678,971 | 5/1954 | Barany | 179—100.2 |
| 2,683,514 | 7/1954 | Hardway | 192—116.5 |
| 2,852,761 | 9/1958 | Hagopian | 340—174.1 |
| 2,878,914 | 3/1959 | Worst | 192—81 |
| 2,884,106 | 4/1959 | Hansen | 192—81 |
| 2,918,656 | 12/1959 | Nolde et al. | 340—174.1 |
| 2,951,568 | 9/1960 | Hungerford et al. | 192—81 |
| 2,956,270 | 10/1960 | Wallens et al. | 340—259 |
| 2,988,604 | 6/1961 | Nye | 179—100.2 |
| 2,989,594 | 6/1961 | McKaig | 179—100.2 |
| 3,060,413 | 10/1962 | Parks | 340—174.1 |
| 3,062,345 | 11/1962 | Cruzen | 192—81 |
| 3,109,898 | 11/1963 | Gray | 179—100.2 |
| 3,159,256 | 12/1964 | Welsh et al. | 192—81 |

FOREIGN PATENTS 552,744 12/1956 Italy.

BERNARD KONICK, *Primary Examiner.*

D. J. WILLIAMS, *Examiner.*

F. R. HANDREN, M. GITTES, *Assistant Examiners.*